United States Patent [19]
F'Geppert

[11] 4,091,901
[45] May 30, 1978

[54] PUMP LOCK-UP POWER TRANSMISSION
[75] Inventor: Erwin F'Geppert, Novi, Mich.
[73] Assignee: The United States of America as represented by the Secretary of the Army, Washington, D.C.
[21] Appl. No.: 742,713
[22] Filed: Nov. 17, 1976
[51] Int. Cl.² .............................................. F16D 31/04
[52] U.S. Cl. ...................................... 192/61; 137/509
[58] Field of Search ............................ 192/59, 60, 61; 137/509, 510

[56] References Cited

U.S. PATENT DOCUMENTS

| | | | |
|---|---|---|---|
| 1,748,436 | 2/1930 | Arkin | 192/61 |
| 2,358,058 | 9/1944 | Crites | 192/61 |
| 2,382,114 | 8/1945 | Stephens | 192/61 |
| 3,870,436 | 3/1975 | Remy | 137/510 |

Primary Examiner—Allan D. Herrmann
Attorney, Agent, or Firm—Peter A. Taucher; John E. McRae; Nathan Edelberg

[57] ABSTRACT

A power transmission providing cushioned shock-absorption power flow from a drive member to a driven member. The transmission includes a gear pump wherein both the gear and gear housing are free to rotate; the transmission also includes a recirculation flow path from the pump outlet to the pump inlet, said flow path comprising a metering valve that responds to pump outlet chamber pressure for progressively throttling the flow as the outlet chamber pressure rises. As the recirculation flow is throttled the pump gear and pump housing gradually lock together and thereafter rotate at approximately the same speed.

1 Claim, 2 Drawing Figures

PUMP LOCK-UP POWER TRANSMISSION

BACKGROUND AND SUMMARY OF THE INVENTION

U.S. Pat. No. 2,371,227 issued to A. Y. Dodge on Mar. 13, 1945 shows a fluid clutch wherein hydraulic fluid is circulated through a gear pump to provide power transmission between a gear and gear housing. A valve in the liquid circuit obstructs liquid flow to produce a hydraulic lock. The present invention involves a variation on the system shown in U.S. Pat. No. 2,371,227, comprising a metering valve that produces a gradual throttling of the liquid flow through the gear pump, whereby the gear and gear housing gradually come to the same speed in a shock proof fashion. The metering valve is regulated by the pressure in the pump outlet chamber so that pump action increases the outlet chamber and simultaneously produces throttling movement of the metering valve.

THE DRAWINGS

Figure 1:
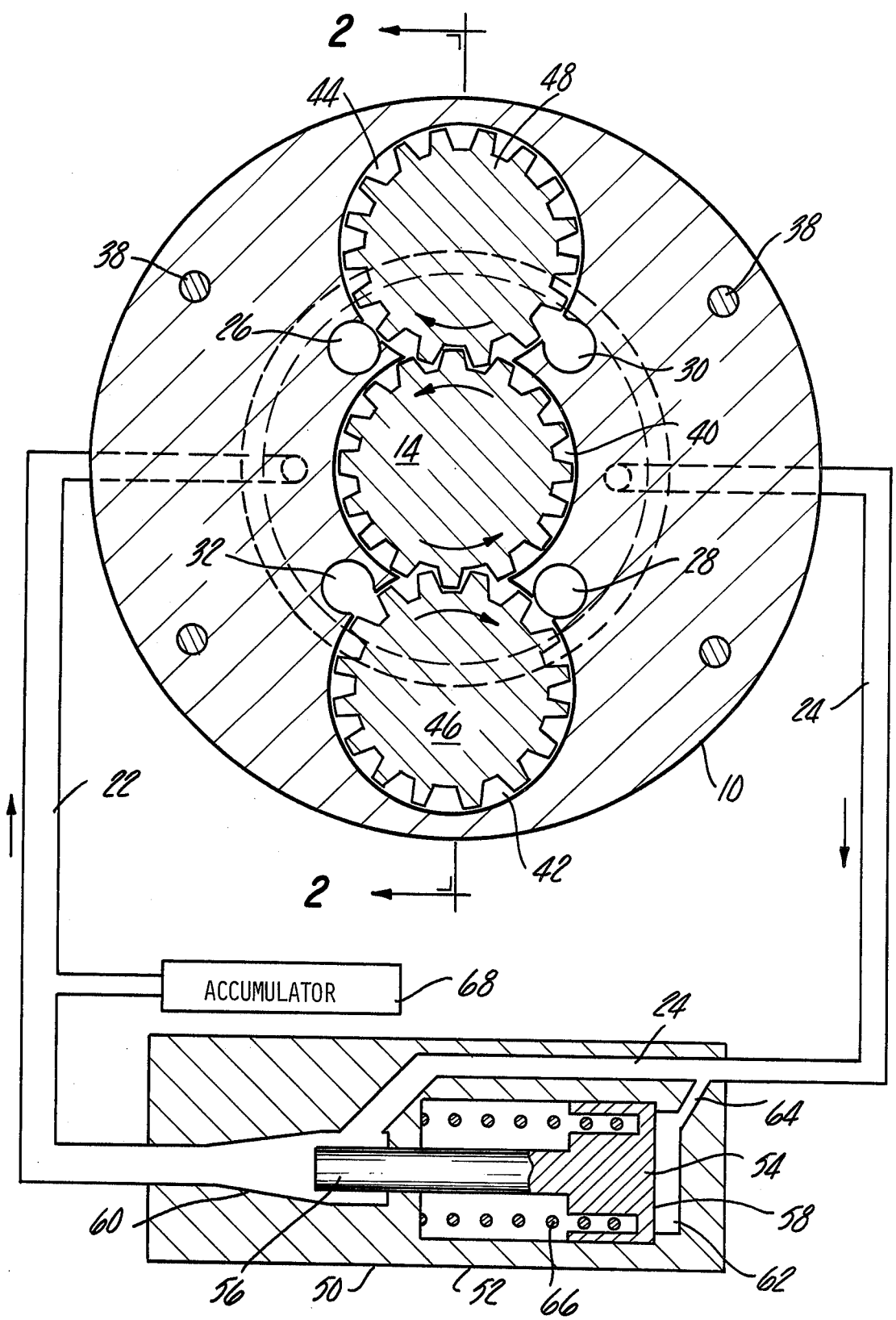
FIG. 1 is a sectional view taken on line 1—1 in FIG. 2, and illustrating a gear pump incorporating this invention.

The drawings show a mechanical power transmission comprising a gear housing 10 connected to a driven shaft or member 12, and a gear 14 connected to a drive shaft 16. The drive and driven shafts 16 and 12 are not visible in FIG. 1, but are shown in FIG. 2.

In the illustrated transmission the drive and driven shafts are rotatably supported in stationary bearing structures 18 and 20, said structures being internally recessed to respectively admit liquid to the gear housing and exhaust liquid from the gear housing. FIG. 2 illustrates stationary housing 18 connected to a liquid supply line 22, and stationary housing 20 connected to a liquid exhaust line 24. Gear housing 10 is provided with drilled inlet chambers 26 and 28 communicating with the recess in stationary structure 18, and two drilled outlet chambers 30 and 32 communicating with the recess in stationary structure 20.

Figure 2:
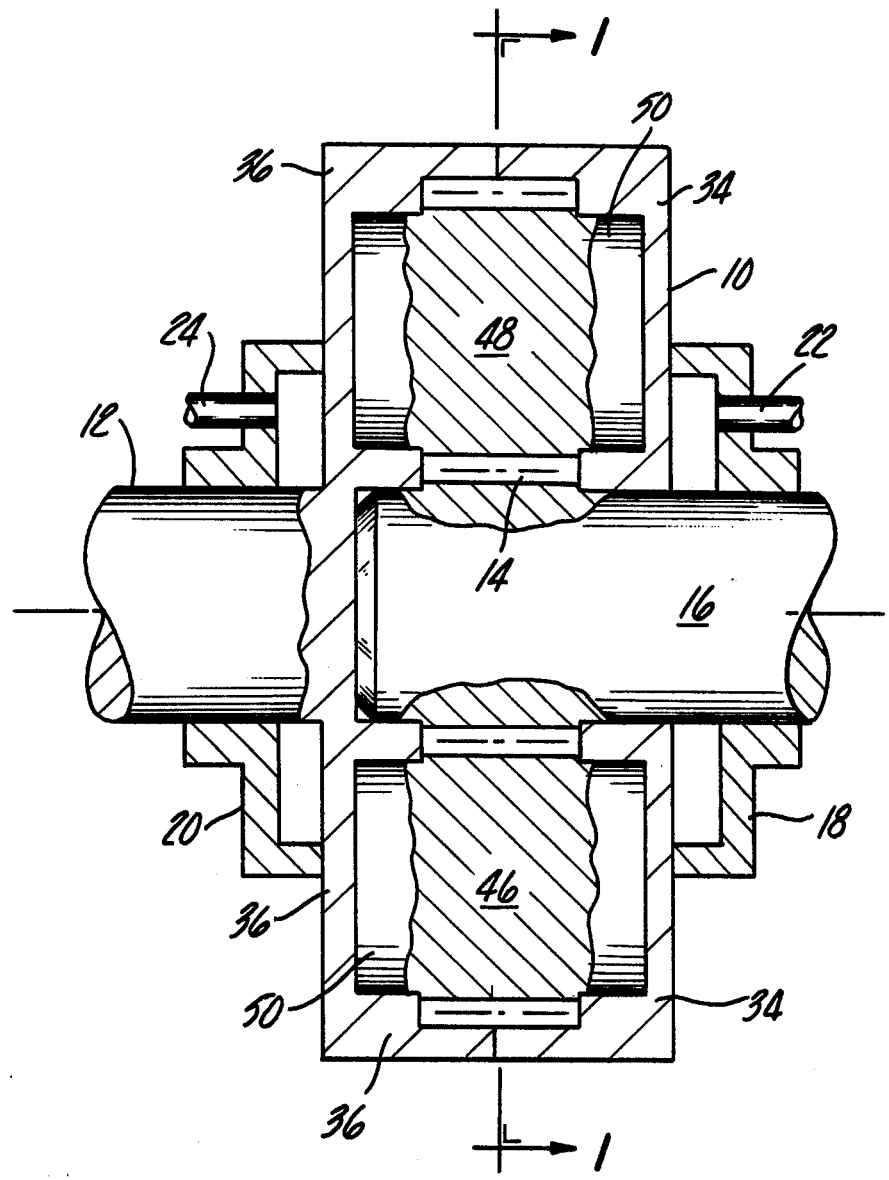
FIG. 2 is a sectional view taken on line 2—2 in FIG. 1.

As best seen in FIG. 2, gear housing 10 comprises two housing members 34 and 36, said member 36 being integral with or otherwise connected to driven shaft 12. Member 34 may be rigidly connected to member 36 by means of four bolts 38 (see FIG. 1). As best seen in FIG. 1, the gear housing is formed with three circular cavities 40, 42 and 44. The aforementioned gear 14 is arranged within cavity 40; the other two cavities floatably accommodate idler 46 and 48. Gear 14 serves as a drive gear to rotate the two gears 46 and 48 in the directions shown in FIG. 1. The two driven idler may be provided with oppositely directed stub shafts 50 locatable within circular recesses in the housing members 34 and 36 to absorb mechanical forces generated between the drive and driven members.

The liquid recirculation circuit shown in FIG. 1 includes a metering valve 50 shown as a stationary housing 52 and a movable piston 54. Piston 54 comprises a small diameter flow-throttling section 56 and a large diameter control section 58. Piston section 56 is arranged to move within a tapered chamber 60 having an inlet port connected to pump exhaust line 24 and an outlet connected to pump supply line 22. Exhaust line 24 is connected to a control chamber 62 through a small duct 64. A compression spring 66 is trained against the left face of the piston control section 58 to exert a force thereon in opposition to the hydraulic force existing within chamber 62, said chamber 62 force being the same as or proportional to the pressure generated by the pump, i.e. gears 14, 46 and 48.

When a driving torque is initially applied to shaft 16 (FIG. 2) the gears 14, 46 and 48 will be initially rotated in the directions shown in FIG. 1; during this initial period the load on shaft 12 will cause gear housing 10 to remain motionless. As the gears 46 and 48 rotate they pump liquid from inlet chambers 28 and 26 around the outer peripheral areas of chambers 42 and 44 to the outlet chambers 32 and 30, and hence into the exhaust line 24. As the pump action raises the pressure in line 24 the increased pressure in chamber 62 moves the piston 54 to the left, thereby causing piston section 56 to progressively throttle the flow through tapered chamber 60. The pressure in line 24 is thereby gradually raised. When the left end of piston 54 completely closes chamber 60 to through-flow the back pressure generated in chambers 30 and 32 will produce hydraulic lock between the various gears 14, 46 and 48, thereby causing the gear housing 10 to rotate with gear 14. The output shaft 12 is thereby driven at the same speed as input shaft 16, assuming a complete hydraulic lock between the three gears.

This flow-throttling action of metering valve 50 preferably occurs as a gradual process so that output shaft 12 gradually comes up to the speed of input shaft 16. The gradualness or pressure rise in exhaust line 24 is a function of the taper of chamber 60 and the rate of spring 66. By producing a gradual rise in the line 24 pressure it should be possible to greatly minimize shock during initial stage of transmission operation, i.e. during the initial period when shaft 16 is accelerating from standstill condition. The operation of the system may be improved by the addition of a low pressure accumulator 68 in the liquid supply line 22; accumulator would advantageously act as a liquid supply means for the pump when piston 54 is in a throttling condition. It will be appreciated that the drawings are semi-schematic in nature, and that variations and modifications may be made without departing from the spirit of invention as comprehended by the attached claims.

I claim:

1. A mechanical power transmission for interposition between drive and driven members: said transmission comprising a hydraulic pump that includes a live rotary gear (14) and a rotary gear housing (10); one of said gear and gear housing being connectable to the drive member, the other of said gear and gear housing being connectable to the driven member;

stationary wall means (18) defining an inlet chamber for delivering liquid to said gear at a first location on its periphery; stationary wall means (20) defining an outlet chamber for receiving liquid from said gear at a second location on its periphery; at least one idler gear (46 or 48) rotatably positioned within a circular cavity (42 or 44) in the gear housing in meshed engagement with said live gear, said circular cavity constituting a pumping passage communicating the inlet chamber with the outlet chamber;

means external to the gear housing defining a liquid recirculation path from the liquid outlet chamber to the liquid inlet chamber; said recirculation path including a metering valve (50) having a liquid flow rate therethrough varying inversely according to the pressure existing in the outlet chamber; said metering valve comprising a stationary valve housing (52) defining a tapered throat (60) of appreciable length; the larger end of said throat having a liquid connection (24) with the aforementioned outlet chamber, and the smaller end of said throat having a liquid connection (22) with the aforementioned inlet chamber; said stationary valve housing (52) further defining a control chamber (62) axially aligned with the tapered throat but separate therefrom, and a duct (64) connecting said control chamber with the first mentioned liquid connection (24); a movable piston (54) having a relatively large diameter control section (58) slidably positioned within the control chamber, and a relatively small diameter cylindrical flow-throttling section (56) extending into the tapered throat; and spring means (66) urging the piston outwardly from the tapered throat in opposition to the hydraulic force on said piston due to the control chamber pressure; said piston being arranged for movement from a fully open condition permitting unthrottled flow through the tapered throat to a fully closed position preventing flow through the throat; the taper on the throat being relatively shallow, whereby the piston has a long effective stroke when moving from its fully open condition to its fully closed condition.

* * * * *